US006598488B1

(12) United States Patent
Sutton et al.

(10) Patent No.: US 6,598,488 B1
(45) Date of Patent: Jul. 29, 2003

(54) CORIOLIS EFFECT FLUID FLOW METER

(75) Inventors: Christopher Mannings Sutton, Wellington (NZ); David Rodney White, Lower Hutt (NZ)

(73) Assignee: Industrial Research Limited (NZ)

(*) Notice: Subject to any disclaimer, the term of this patent is extended or adjusted under 35 U.S.C. 154(b) by 0 days.

(21) Appl. No.: 09/720,546

(22) PCT Filed: Jul. 2, 1999

(86) PCT No.: PCT/NZ99/00103

§ 371 (c)(1),
(2), (4) Date: Mar. 26, 2001

(87) PCT Pub. No.: WO00/02019

PCT Pub. Date: Jan. 13, 2000

(30) Foreign Application Priority Data

Jul. 29, 1908 (NZ) .................................. 330856

(51) Int. Cl.[7] .............................................. G01F 1/84
(52) U.S. Cl. ................................................ 73/861.355
(58) Field of Search .................... 73/861.355, 861.356, 73/861.357

(56) References Cited

U.S. PATENT DOCUMENTS

| 3,261,213 A | | 7/1966 | Zeldman et al. |
| 3,485,098 A | | 12/1969 | Sipin |
| 3,927,565 A | | 12/1975 | Pavlin et al. |
| 4,109,524 A | | 8/1978 | Smith |
| 4,127,028 A | | 11/1978 | Cox et al. |
| 4,187,721 A | * | 2/1980 | Smith .......................... 73/194 |
| 4,192,184 A | | 3/1980 | Cox et al. |
| 4,252,028 A | | 2/1981 | Smith et al. |
| 4,381,680 A | | 5/1983 | Shiota |
| 4,729,243 A | | 3/1988 | Friedland et al. |
| 4,776,220 A | | 10/1988 | Lew |
| 4,803,867 A | | 2/1989 | Dahlin |
| 4,840,071 A | | 6/1989 | Lew |
| 4,852,410 A | | 8/1989 | Corwon et al. |
| 4,856,346 A | | 8/1989 | Kane |

(List continued on next page.)

FOREIGN PATENT DOCUMENTS

| EP | 0282217 | 9/1988 |
| JP | 58178217 | 10/1983 |
| JP | 63018219 | 1/1988 |
| JP | 4109121 | 4/1992 |
| JP | 08035872 | 2/1996 |
| SU | 732672 | 5/1980 |
| SU | 1739204 | 6/1992 |

OTHER PUBLICATIONS

F. Cascetta et al., "A new straight–pipe coriolis mass flowmeter: the mathematical model," Measurement, vol. 9 No. 3, Jul.–Sep. 1991, pp. 115–123.

De Boom, "A User's Perspective of Coriolis Flowmeters", 44th Annual Symposium on Instrumentation for the Processes Industry, 1989, pp. 7–10.

Tsutsui et al., "Coriolis Force Mass–Flow Meter Composed of a Straight Pipe and an Additional Resonance–Vibrator", Jpn. J. Appln. Phys., vol. 32 (1993) pp. 2369–2371.

Primary Examiner—Hezron Williams
Assistant Examiner—Jewel V. Thompson
(74) Attorney, Agent, or Firm—Dann, Dorfman, Herrell and Skillman, P.C.

(57) ABSTRACT

A Coriolis effect fluid flow meter comprises a tube curved about a first axis and mounted for oscillatory motion about a second axis, means to drive the tube in a controlled oscillatory motion about said second axis to generate in fluid flowing in the tube a measurable bi-direction force, a pair of flexible couplings through which fluid flow passes arranged to minimise forces on the tube due to the inherent stiffness of the tube, and means arrange to measure the bi-directional force in the direction of said first axis and to derive the fluid flow therefrom.

8 Claims, 3 Drawing Sheets

U.S. PATENT DOCUMENTS

| | | | | |
|---|---|---|---|---|
| 4,895,031 A | * | 1/1990 | Cage | 73/861.355 |
| 4,934,195 A | | 6/1990 | Hussain | |
| 5,044,208 A | | 9/1991 | Corown et al. | |
| 5,115,683 A | | 5/1992 | Pratt | |
| 5,253,533 A | | 10/1993 | Lam et al. | |
| 5,501,106 A | * | 3/1996 | Lew et al. | 73/861.355 |
| 5,663,509 A | | 9/1997 | Lew et al. | |
| 5,700,958 A | * | 12/1997 | Lew et al. | 73/861.357 |
| 5,926,096 A | * | 7/1999 | Mattar et al. | 73/861.355 |

* cited by examiner

CORIOLIS EFFECT FLUID FLOW METER

FIELD OF INVENTION

This invention relates to apparatus for measuring the flow of a fluid mass.

In this specification the term "fluid" is intended to refer to any flowing substance whether it may be liquid or a gaseous or a polyphase substance such as a liquid/solid or a liquid/gas.

BACKGROUND OF INVENTION

Various methods are known for the measurement of the flow of a fluid mass and in particular it is known to use flow meters based on the Coriolis effect because they are capable of measuring the mass flow directly and are relatively insensitive to the properties, such as density and viscosity, of the fluid being measured. However, one of the main disadvantages of flow meters based on the Coriolis effect measurement is because the Coriolis forces generated are generally very small, the measurements are subject to interference from effects which are difficult to suppress.

Boom R J in "A User's Perspective for Coriolis Flow Meters" 44th Annual Symposium on Instrumentation for the Processes Industry 1989 referred on pages 7–10 to some patents granted in the 1950's for "gyroscopic mass flow meters". All of these early meters involved curved members, a means of oscillation/vibration, and some sort of flexible coupling or slip joints and all attempted to measure the torque caused by the gyroscopic (Coriolis) effect. Such early gyroscopic meters were failures and all exhibited a common problem that because the Coriolis forces were small compared to other forces, then it was not possible to obtain accurate readings.

U.S. Pat. No. 3,927,565 describes an apparatus for measuring the mass flow of fluid and utilises a rectilinear pipe which can be rotated about an axis which is not parallel with the longitudinal axis of the pipe. The apparatus also includes a means for making the fluid flow through the pipe and means for measuring the force which the fluid flowing through the pipe exerts on a segment of the pipe.

U.S. Pat. No. 4,109,524 describes another method of measuring the mass flow rate using the Coriolis effect and describes an apparatus which includes a conduit having sections. A section of one end of the conduit is reciprocated and the torque generated by the Coriolis force is measured.

U.S. Pat. No. 4,252,028 describes an apparatus for measuring mass flow and utilises a plurality of channels which are provided in one or more conduits which rotate or oscillate as a common unit. Additive streams flow to the channels in one direction and subtractive streams are flowed through the channels in the opposite direction and the Coriolis force thereby imposed on the conduit is measured.

SUMMARY OF INVENTION

The invention provides an improved or at least alternative form of Coriolis flow meter.

In broad terms in one aspect the invention comprises a flow meter based on the Coriolis effect comprising a substantially U shaped tube driven in a controlled oscillatory motion about an axis to generate in the fluid within the tube a measurable bidirectional force, said U tube including flexible couplings intermediate of the length of the tube and adapted to allow the tube to be oscillated at a frequency which is not necessarily the resonant frequency of the tube.

In broad terms in another aspect the comprises a fluid flow meter based on the Coriolis effect comprising two U shaped tubes each including flexible couplings intermediate of their length and each being adapted to be excited by an oscillatory motion in which the motion in one tube is 180° out of phase with the other tube and wherein the fluid flow through the tubes is in the same direction, means being provided to measure the difference in oscillatory force between the two tubes.

In broad terms in a further aspect the invention comprises a fluid flow meter based on the Coriolis effect comprising two U shaped tubes each including flexible couplings intermediate of their length and each being adapted to be excited by an oscillatory motion in which the motion in one tube is in phase with the other tube and wherein the fluid flow through the tubes is in the opposite direction, means being provided to measure the difference in oscillatory force between the two tubes.

BRIEF DESCRIPTION OF THE DRAWINGS

The invention is described with reference to the accompanying drawings by way of example and without intending to be limiting, in which.

DETAILED DESCRIPTION

Figure 1:
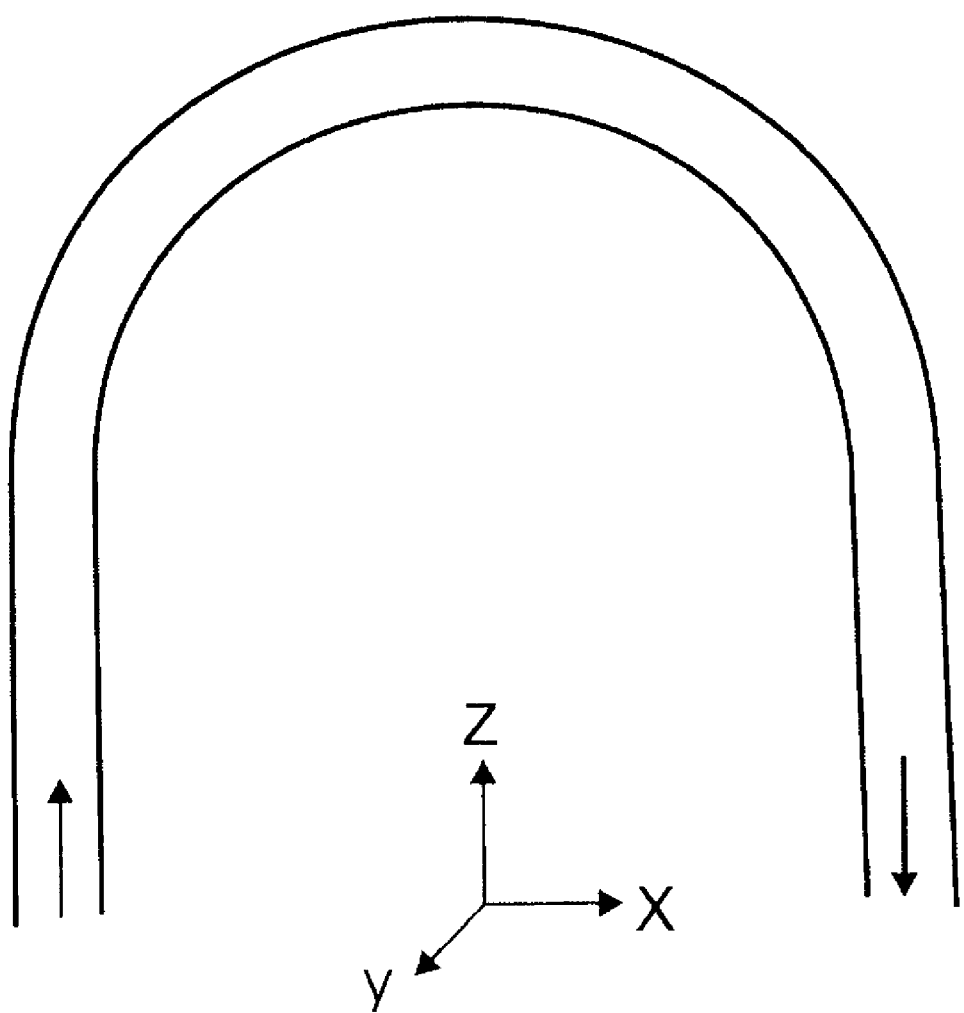
FIG. 1 is a diagrammatic view of the basic principle of a Coriolis mass flow meter.

In the basic type of Coriolis flow meter as shown in FIG. 1, fluid flows through the tube about the y axis and at the same time the tube is rotated about the x axis. The two motions will result in a torque about the z axis. The torque about the z axis is proportional to the mass flow rate through the tube.

Figure 2:
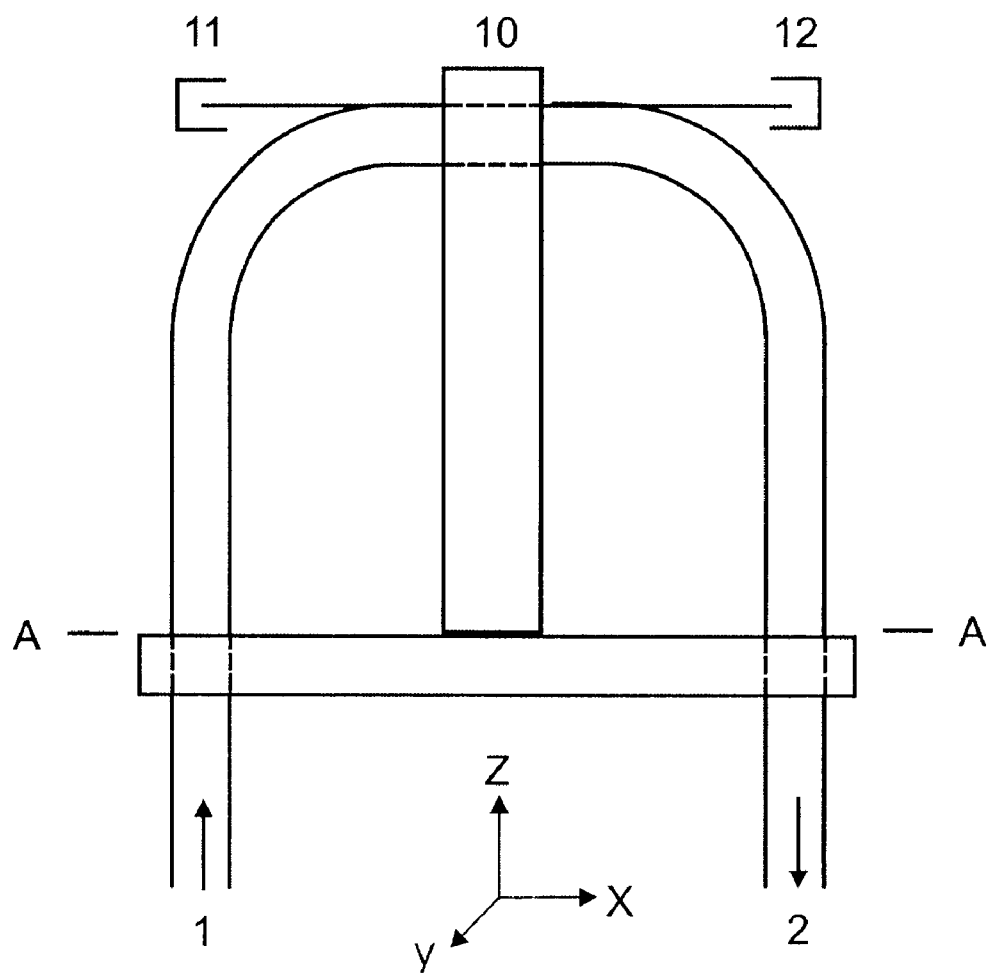
FIG. 2 is a diagrammatic view of a known Coriolis flow meter which utilises the tubular arrangement as shown in FIG. 1.

FIG. 2 illustrates a Coriolis mass flow meter utilising this basic principle. A single U tube has an inlet 1 and an outlet 2 so that fluid can flow through the tube in the direction indicated by the arrows. The tube is fixed at AA and the tube is excited into an oscillatory angular motion about the x axis, at a resonant frequency determined by the stiffness of the tube, the mass of the tube, and the fluid with the tube. Various means of providing the oscillatory angular motion can be utilised such as a magnetic forcer indicated at 10. The oscillatory angular motion results in Coriolis forces being generated by the fluid as it is constrained to follow this tube motion. These forces will result in an oscillatory twisting of the tube about the z axis by an amount proportional to the mass flow rate and inversely proportional to the tube stiffness. The degree of twist and consequently the mass flow rate is obtained by computing the difference in the transit times of the points 11 and 12 through a reference x,z plane.

This basic design of Coriolis mass flow meter is still relatively unchanged although a variety of different tube parameters, including bent tubes, straight tubes, single tubes and split tubes, have been tried to improve performance and overcome the sensitivity of earlier designs to various field and environmental effects such as temperature, pressure, vibration and mechanical stress.

The principal problem with this basic design is that it is barely viable. It relies on the elastic properties of the flow tube and hence the design is always a compromise between maximising the tube diameter for low pressure drop and minimising the tube stiffness for high flow sensitivity. A larger diameter tube is stiffer and twists less. Consequently, the wall of the flow tube must be thin to minimise flexural stiffness which in combination with high flow velocities can lead to stress and tube erosion problems.

As a result, both the pressure drop across current Coriolis flow meters and the drop in velocity of the fluid flow is large compared with other types of flow meter. Another problem is that the signals to be measured are extremely small and so can lead to inaccuracies. Typical twists in the tube are less than 10 μm and transit time differences between the points 11 and 12 are of order 10 μs. Current Coriolis flow meters are therefore sensitive to external infuences as mentioned above, and suffer from zero instability which limits their available range. They also depend on the stability of the elastic properties of the flow tube which limits their potential fractional accuracy.

One reason for the design remaining relatively unchanged is that the density of the flowing fluid can be obtained from the resonant frequency of the tube or tubes. However, this density measurement is also dependent on the elastic properties of the flow tube(s) and is non-linearly related to the measure resonant frequency.

Figure 3:
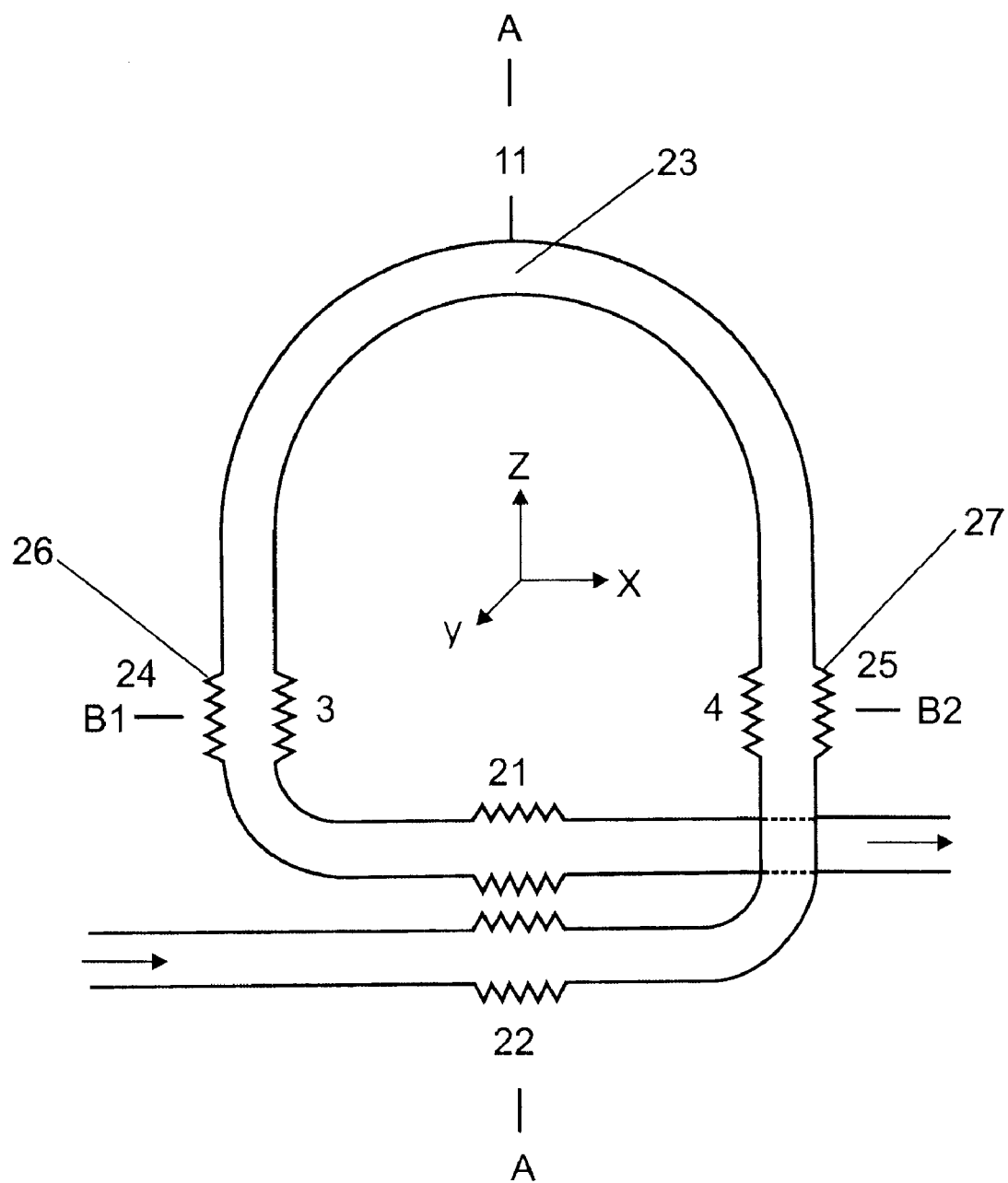
FIG. 3 is a diagrammatic view of a Coriolis flow meter of the present invention.

FIG. 3 shows a Coriolis flow meter of the invention which is similar to the flow meter shown in FIG. 2 except that the flow meter can be driven in an accurately controlled oscillatory motion about the axis AA (see FIG. 2) at a frequency that is not necessarily a mechanical resonance of the flow tubing. The flexible couplings 21 and 22 facilitate this motion. The frequency and the amplitude of this torsional oscillation are chosen to enhance the performance of the meter and both these parameters are actively controlled during flow measurements.

The flow rate is obtained by measuring the oscillatory bi-directional force in the Y direction at point 23, this force being proportional to the precessional torque induced about the X axis 24, 25 due to the Coriolis effect. The force may be measured by a sensitive and accurate sensor such as an electromagnetic force balance device which also prevents the flow tube from rotating about the axis 24, 25.

The flexible couplings 26, 27 are utilised to ensure there are no significant forces at the point 23 resulting from tube stiffness.

Phase sensitive measurement of the force at 23 can be utilised to improve the signal to noise ratio and hence the precision of the flow measurement. The tube diameter can be relatively large to keep both the fluid flow velocity and the pressure drop across the flow meter small without degrading the performance of the meter. The fluid density can be derived from the oscillatory torque required to rotate the flow tube and the fluid within the tube about the axis AA which will be directly proportion to fluid density. This torsional drive could be electromagnetic in which case the fluid density will be proportional to the drive current.

In an alternate form of the invention, if the plane of the flow meter is horizontal instead of vertical as indicated in FIG. 3, the fluid density can be obtained from the gravitational torque of the fluid in the tube acting about the axis 24, 25. In this form the fluid density will be proportional to the average force at 23 in the y direction. The use of relatively large tube diameter will improve the accuracy of the density measurement by increasing either the mass of fluid accelerated into torsional oscillation or the mass of fluid exerting a force at the point 23 due to gravity.

The essential feature of the invention is the provision of the flexible couplings which enables the sensing and oscillatory drive components to be changed. For example a variation of the modification shown in FIG. 3 may have the same basic configuration as the mass flow meter shown in FIG. 2 and in this variation the oscillatory motion is applied at the point 23 about the axis 24, 25 and by utilising bi-directional force sensors to measure the fluid mass flow at points 24 and 25.

Variations of the invention can be applied by utilising a double loop version of the mass flow meter indicated in FIG. 3 to which two tubes are located adjacent to each other and with the fluid flow through the tubes being in the same direction while the oscillatory motions of the two tubes are separated in phase by 180°. In this case the sensor at 23 will measure the difference in force between the two loops.

In a yet further variation of the double loop version the two tubes can be oscillated in unison about the axis AA and the flows can be in the tubes in opposite directions.

The foregoing describes the invention and modifications as will be obvious to those skilled in the art are intended to be included within the scope of the invention, as defined in the following claims.

What is claimed is:

1. A fluid flow meter comprising a tube curved about a first axis and mounted for oscillatory motion about a second axis, said tube having a first end and a second end, means operatively connected to said tube for driving the tube in a controlled oscillatory motion about said second axis to generate in fluid flowing in the tube a measurable bi-directional force, measurement means operatively connected to said tube and arranged to measure the bidirectional force, at a specific point on the curved tube, in the direction of said first axis and to derive the fluid flow therefrom, and a pair of flexible couplings towards either end of the tube through which the fluid flow passes into and from the tube and by which said tube is mounted, the flexible couplings being positioned to facilitate movement of the tube about a third axis and minimize forces on the tube due to the stiffness of the tube so that the signal measured by the measurement means is independent of the mechanical stiffness of the tube.

2. A fluid flow meter according to claim 1 wherein said first axis is a vertical axis.

3. A fluid flow meter according to claim 1 wherein said first axis is a horizontal axis and fluid density is obtained from the gravitational torque of the fluid in the tube acting about a horizontal axis.

4. A fluid flow meter according to claim 1 comprising two curved tubes, each tube including a pair of flexible couplings through which the fluid flow passes arranged to minimise forces on the tube due to inherent stiffness of the tube, and means to drive the tubes in a controlled oscillatory motion in which the motion of one tube is 180° out of phase with the motion of the other tube and means to measure the difference in oscillatory force between the two tubes and derive the fluid flow therefrom.

5. A fluid flow meter according to any one of claims 1 to 4 wherein said curved tube or tubes is or are a U-shaped tube or tubes.

6. A fluid flow meter according to claim 1 wherein the tube is in the form of a loop.

7. A fluid flow meter according to any one of claim 1 to 4 or 6 wherein the tube or each of the tubes of the flow meter includes a second pair of flexible couplings through which the fluid flow passes mounted to facilitate the oscillatory motion of the tube or tubes.

8. A fluid flow meter according to claim 5 wherein the tube or each of the tubes of the flow meter includes a second pair of flexible couplings through which the fluid flow passes mounted to facilitate the oscillatory motion of the tube or tubes.

* * * * *